H. G. TRENCH.
SHACKLE FOR VEHICLE SPRINGS.
APPLICATION FILED NOV. 25, 1911.
1,042,173.
Patented Oct. 22, 1912.
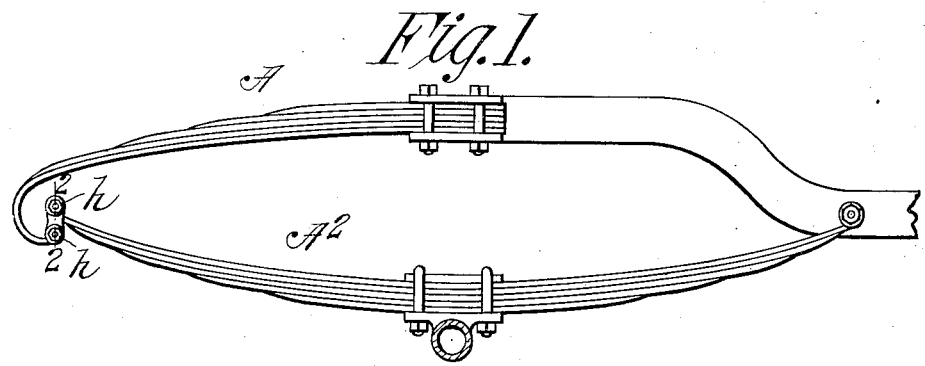
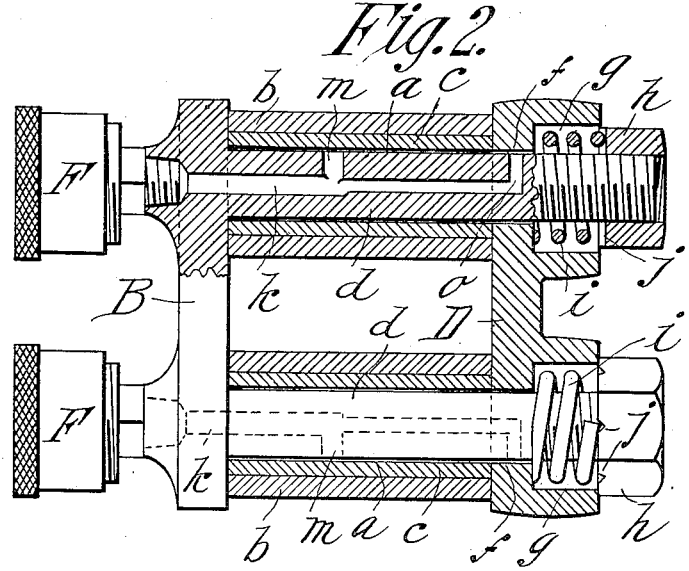
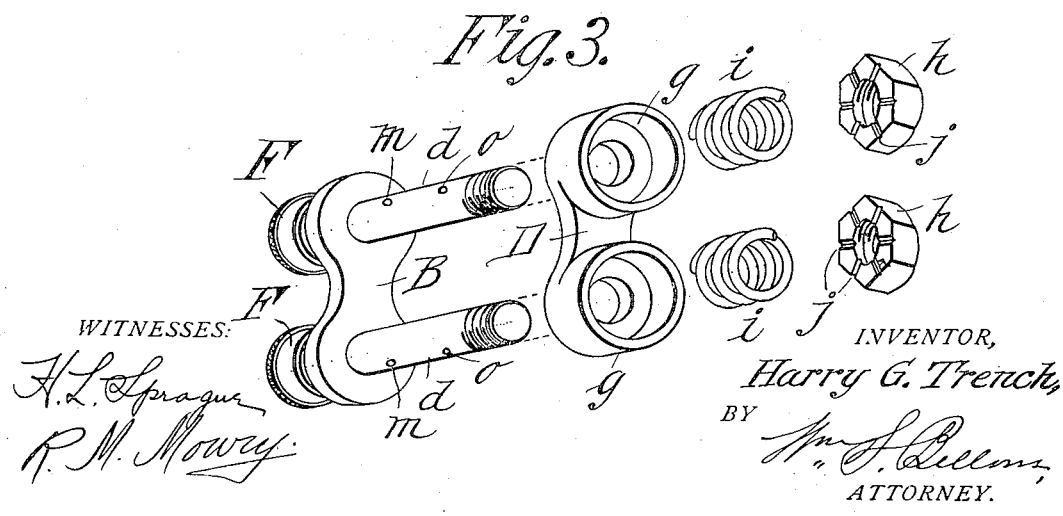
WITNESSES:
H. L. Sprague
R. M. Mowry
INVENTOR,
Harry G. Trench,
BY
Wm. S. Dillon,
ATTORNEY.

UNITED STATES PATENT OFFICE.

HARRY G. TRENCH, OF SPRINGFIELD, MASSACHUSETTS.

SHACKLE FOR VEHICLE-SPRINGS.

1,042,173.  Specification of Letters Patent.  Patented Oct. 22, 1912.

Application filed November 25, 1911. Serial No. 662,399.

*To all whom it may concern:*

Be it known that I, HARRY G. TRENCH, a citizen of the United States of America, and resident of Springfield, in the county of Hampden and State of Massachusetts, have invented certain new and useful Improvements in Shackles for Vehicle-Springs, of which the following is a full, clear, and exact description.

This invention relates to improvements in shackles for uniting the eye-formed ends of half, three-quarters, or fully elliptical leaf or carriage springs, and has for its object to provide means whereby lash or looseness between the opposite edges of the eye-formed springs and the adjacent members of the shackle are prevented with consequently an avoidance of rattling and noise; and also to provide means for the efficient lubrication of the relatively movable parts of the shackle.

The invention is described in conjunction with the accompanying drawings and set forth in the claims.

In the drawings:—Figure 1 is a side elevation of a three-quarter elliptical carriage or automobile spring, an end of both members of the spring being united by the shackle. Fig. 2 is a sectional view, on a much larger scale, through the shackle as taken on line 2—2, Fig. 1. Fig. 3 is a disassembled perspective view of the shackle.

In the drawings, A and A² represent leaf formed members of an automobile or carriage spring having eyes $a$ $a$ in their approached end portions $b$ $b$ through which eye formed extremities the dowel like members $d$ $d$ of the shackle are engaged. As usual, the eye-formed portions of the leaf springs are made with the inclusion of tubular bushings $c$ $c$.

The shackle in part comprises a bar B having the dowel-like extensions $d$ $d$ formed as one therewith or rigidly affixed thereto and projecting from the bar in parallelism at right angles to the length of such bar and extending through and beyond the eyes of the respective spring members. The shackle, furthermore, comprises another bar D having apertures $f$ $f$ therethrough and provided with sockets $g$ at its outer side concentrically of said apertures, through which apertures and sockets the said dowel like projections $d$ $d$ are extended. Nuts $h$ $h$ are screw engaged on the threaded protruding ends of the dowel like extensions $d$, and spiral springs $i$ $i$, having portions of the lengths thereof in said sockets, are engaged by said nuts so as to force the bar D which is slidable on the dowel like extensions $d$ $d$ of the other bar B toward the latter bar for taking up looseness or slack between the opposite edges of the springs and the pair of bars between which they are shackled. The springs $i$ $i$ not only serve to prevent rattling, but they cause the ends of the leaf springs to be frictionally bound between the bars B and D, whereby the device acts as a shock absorber. The inner faces of the nuts are made with radial notches $j$ $j$, and the springs seated in the aforesaid sockets and engaged by the said nuts have the ends of their outer coils, which may be slightly angularly turned, engaged in the notches of the nuts so as to form nut locks.

The aforementioned bar B and the dowel like extensions thereof have oil passages $k$ leading from the outer side of the bar through the latter and continued for a considerable distance axially through the extensions $d$ with which passages the oil cups F F are connected. The oil passages in the dowel like extensions have ports $m$ leading to the peripheries of the extensions at their portions which are embraced by the spring eyes; and they also have ports $o$ leading to the periphery of the extensions at the portions thereof which are embraced by the slidable bar D so that at one and the same time ample lubrication is provided between the spring and the dowel like members which pass through the eyes thereof and also between the slidable bar and the said dowel like members.

I claim:—

1. A spring shackle consisting of a bar having a pair of dowel like extensions rigidly fixed to and projecting from the bar in separation and parallelism at right angles to the length of the bar, another bar having apertures therethrough and slidable on said projections, compression members on the ends of the projections outside of the slidable bar, springs between said compression members and the slidable bar, leaf springs having eyes in the ends thereof individually engaging the dowel like extensions, the slidable mounting of the last named bar upon said extension permitting said bar to bear upon the opposite edges of said leaf springs under the tension of the first named springs.

2. A spring shackle consisting of a bar having a pair of dowel like extensions rigidly fixed to and projecting from the bar in separation and parallelism at right angles to the length of the bar, another bar having apertures therethrough and slidable on said projections, compression members on the ends of the projections outside of the slidable bar, springs between said compression members and the slidable bar, leaf springs having eyes in the ends thereof individually engaging the dowel like extensions, the slidable mounting of the last named bar upon said extension permitting said bar to bear upon the opposite edges of said leaf springs under the tension of the first named springs, said dowel extensions having lubricating ports formed therein leading to the bearing surface of the leaf springs and to the bearing surface of the slidable bar upon said extensions.

3. A spring shackle consisting of a bar and a pair of dowel-like members arranged in separation and parallelism at right angles to the length of the bar, another bar having apertures therethrough and slidable on said members, compression members on the ends of the dowel-like members outside of the slidable bar, leaf springs having eyes in the ends thereof individually engaging the dowel-like members,—the slidable mounting of the second named bar upon the dowel-like members causing both of said bars to constantly maintain bearings upon the opposite edges of the leaf springs under the tension of the first named springs.

Signed by me at Springfield, Mass., in presence of two subscribing witnesses.

HARRY G. TRENCH.

Witnesses:
  WM. S. BELLOWS,
  G. R. DRISCOLL.